US009102401B2

United States Patent
Collins et al.

(10) Patent No.: US 9,102,401 B2
(45) Date of Patent: Aug. 11, 2015

(54) WING EXTENSION CONTROL SURFACE (75) Inventors: Bob Collins, Bedford, TX (US); Frank B. Stamps, Colleyville, TX (US); John J. Corrigan, III, Coppell, TX (US); Mark E. Dreier, Arlington, TX (US)

(73) Assignee: Textron Innovations Inc., Providence, RI (US)

( * ) Notice: Subject to any disclaimer, the term of this patent is extended or adjusted under 35 U.S.C. 154(b) by 815 days.

(21) Appl. No.: 13/255,268

(22) PCT Filed: Mar. 12, 2009

(86) PCT No.: PCT/US2009/036889
§ 371 (c)(1),
(2), (4) Date: Sep. 8, 2011

(87) PCT Pub. No.: WO2010/104509
PCT Pub. Date: Sep. 16, 2010

(65) Prior Publication Data
US 2011/0315827 A1 Dec. 29, 2011

(51) Int. Cl.
*B64C 27/28* (2006.01)
*B64C 29/00* (2006.01)

(52) U.S. Cl.
CPC .................. *B64C 29/0033* (2013.01)

(58) Field of Classification Search
CPC .... B64C 29/0033; B64C 23/065; B64C 3/38; B64C 29/0008
USPC ............... 244/7 R, 7 C, 17.23, 17.25, 39, 7 A
See application file for complete search history.

(56) References Cited

U.S. PATENT DOCUMENTS

| 1,846,992 | A |   | 2/1932  | Decker              |         |
|-----------|---|---|---------|---------------------|---------|
| 3,107,882 | A | * | 10/1963 | Matteson et al.     | 244/7 C |
| 3,181,810 | A | * | 5/1965  | Olson               | 244/7 R |
| 3,666,209 | A |   | 5/1972  | Taylor              |         |
| 5,096,140 | A |   | 3/1992  | Dornier, Jr. et al. |         |
| 5,141,176 | A | * | 8/1992  | Kress et al.        | 244/7 C |
| 6,367,736 | B1 |  | 4/2002  | Pancotti            |         |
| 6,607,161 | B1 |  | 8/2003  | Krysinski et al.    |         |
| 7,802,754 | B2 |  | 9/2010  | Karem               |         |
| 2006/0151272 | A1 | | 7/2006 | Smith et al.        |         |
| 2013/0026302 | A1 | * | 1/2013 | Lee et al.         | 244/7 R |

OTHER PUBLICATIONS

International Search Report and the Written Opinion of the International Searching Authority mailed by ISA/USA, U.S. Patent and Trademark Office on Jun. 12, 2009 for International Patent Application No. PCT/US09/36889.
European Office Action dated Feb. 4, 2014 from counterpart EP App. No. 09841622.5.

(Continued)

*Primary Examiner* — Rob Swiatek
(74) *Attorney, Agent, or Firm* — James E. Walton; Richard G. Eldredge (57) ABSTRACT

A tiltrotor aircraft includes a rotatable nacelle that supports a rotor assembly and is pivotally attached to the air-craft's fuselage. A wing extension attaches to an outboard section of the nacelle. The wing extension provides additional yaw control during helicopter mode and additional lift during airplane mode. A method for controlling at least a portion of yaw movement includes positioning the rotor assembly in helicopter mode, creating rotor wash with the rotor assembly, and pivotally rotating the wing extension in the rotor wash.

10 Claims, 7 Drawing Sheets

(56) References Cited

OTHER PUBLICATIONS

International Preliminary Report on Patentability mailed by ISA/USA, U.S. Patent and Trademark Office on Nov. 4, 2011 for International Patent Application No. PCT/US09/36889, 10 pages.

Canadian Office Action dated Dec. 10, 2013 from counterpart CA App. No. 2754206.

Examination Report dated Oct. 14, 2014 from CA counterpart App. No. 2,754,206.

Examination Report dated Oct. 17, 2014 from EP counterpart App. No. 09841622.5.

\* cited by examiner

WING EXTENSION CONTROL SURFACE

TECHNICAL FIELD

The present application relates to wing extensions, and more particularly to a wing extension for a tiltrotor aircraft.

DESCRIPTION OF THE PRIOR ART

Tiltrotor and tiltwing aircraft operate in two modes: helicopter and airplane modes. In helicopter mode, the aircraft's rotors are positioned to create lift, thereby enabling the aircraft to achieve vertical take-off and landing. In this configuration, the aircraft is essentially a helicopter. As the aircraft gains speed, the rotors are slowly tilted forward, eventually transitioning to airplane mode. In airplane mode, the aircraft is essentially a turboprop aircraft.

A typical tiltwing aircraft transitions between helicopter and airplane mode by pivotally moving the aircraft's entire wing span to a position substantially perpendicular and horizontal to the aircraft's fuselage, respectively. The tiltwing configuration is ideal for reducing rotor wash interaction with the aircraft's wing during helicopter mode. But, a tilt-wing configuration has found very little application because conversion from helicopter to airplane mode, and vice-versa, is difficult and inefficient.

A typical tiltrotor aircraft improves upon the tiltwing configuration. Unlike the tiltwing configuration, a typical tiltrotor includes fixed wing members. In helicopter mode, the aircraft's nacelles rotate to a vertical position, and as the aircraft moves forward, the nacelles rotate to a horizontal position.

In some tiltrotor aircraft, a section of the wing span rotates with the nacelle assembly. This design decreases rotor wash loads on the aircraft's wings. This type of tiltrotor aircraft has found little application because of the difficulties associated with incorporating a partially rotatable wing in lieu of having a rigid whole wing.

In some tiltrotor aircraft, four wing members are used in conjunction with four nacelles for purposes of lifting heavy payloads. This type of tiltrotor aircraft is known as a quad-tiltrotor aircraft.

Although great strides have been made in the area of improving tiltrotor aircraft, considerable shortcomings remain.

BRIEF DESCRIPTION OF THE DRAWINGS

The novel features believed characteristic of the invention are set forth in the description. However, the invention itself, as well as, a preferred mode of use, and further objectives and advantages thereof, will best be understood by reference to the following detailed description when read in conjunction with the accompanying drawings, wherein.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as described herein.

DESCRIPTION OF THE PREFERRED EMBODIMENT

The present application discloses substantial improvements in the field of helicopters and other rotorcraft. The present application describes a rotatable wing extension that pivotally attaches to the outboard section of the aircraft's nacelle. The wing extension creates additional yaw control during helicopter mode and increases lift during airplane mode. The additional lift enables the aircraft to increase payload capacity.

Illustrative embodiments are described below. In the interest of clarity, not all features of an actual implementation are described in this specification. It will of course be appreciated that in the development of any such actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 1A:
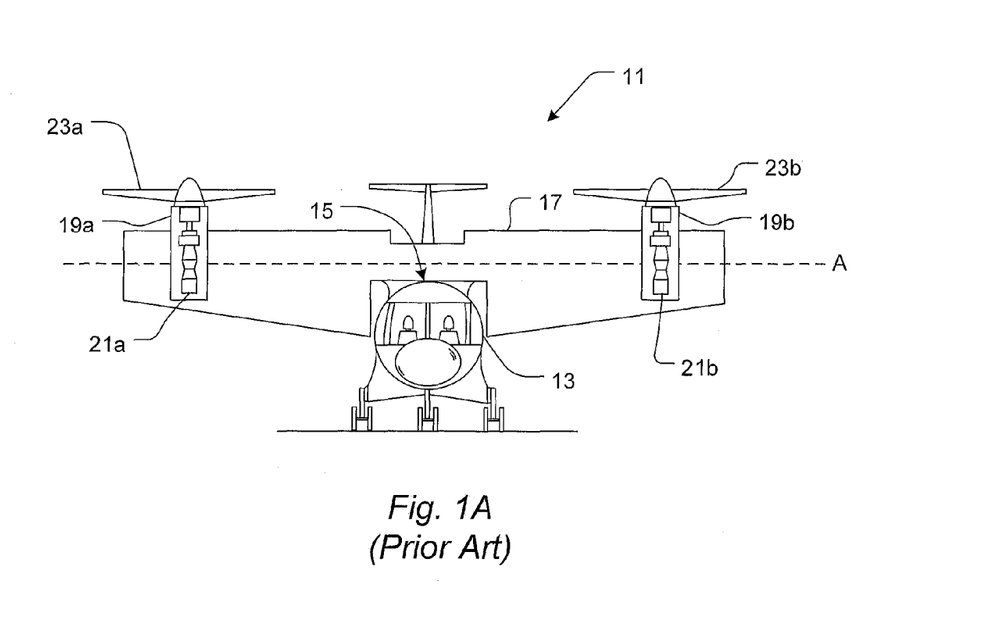
FIGS. 1A and 1B are front views of a tiltwing aircraft shown in helicopter mode and in airplane mode, respectively.
Figure 1B:
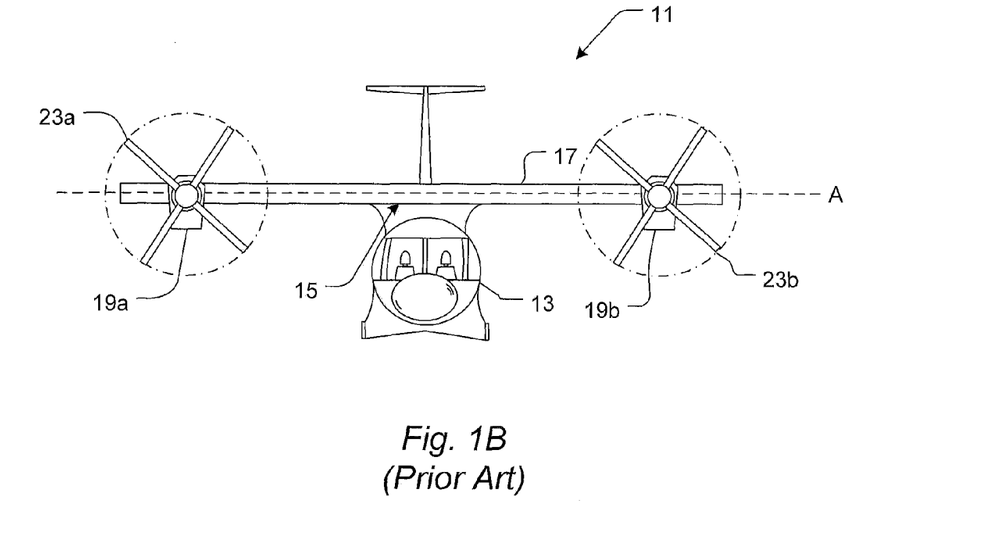

Referring now to FIGS. 1A and 1B in the drawings, a front view of a tiltwing aircraft 11 is illustrated. In FIG. 1A, tiltwing aircraft 11 is shown in helicopter mode, while FIG. 1B shows tiltwing aircraft 11 in airplane mode. Tiltwing aircraft 11 includes a fuselage 13 having an upper surface 15 pivotally attached to a wing 17. Wing 17 rigidly attaches to two nacelles 19a, 19b, that carry respective engines 21A, 21B and propellers 23a, 23b. In helicopter mode, wing 17 is positioned substantially perpendicular to fuselage 13. In airplane mode, wing 17 rotates about axis A to a position substantially parallel to fuselage 13.

Figure 2A:
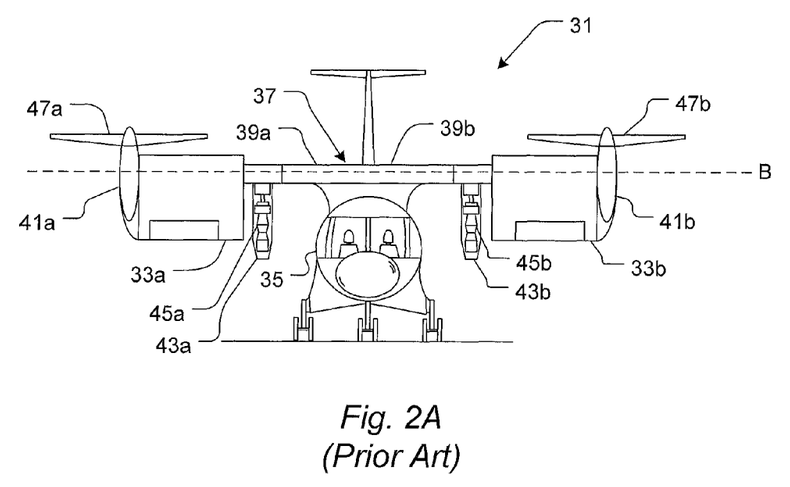
FIGS. 2A and 2B are front views of a tiltrotor aircraft with a partially rotatable wing shown in helicopter mode and in airplane mode, respectively.
Figure 2B:
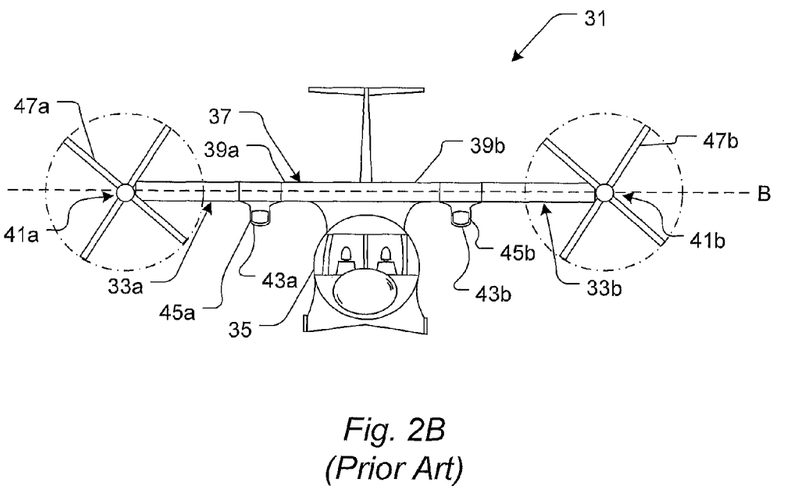

Referring now to FIGS. 2A and 2B in the drawings, a front view of a tiltrotor aircraft 31 is illustrated with rotatable wing sections 33a, and 33b. FIG. 2A shows aircraft 31 in helicopter mode, while FIG. 2B shows aircraft 31 in airplane mode. Tiltrotor aircraft 31 includes a fuselage 35 rigidly attached to a wing 37. Wing 37 includes rotatable wing sections 33a, 33b, pivotally coupled to respective fixed wing sections 39a, 39b. Two rotor nacelles 41A, 41B rigidly attach to wing sections 33a, 33band carry respective proprotors 47A, 47B. Two engine nacelles 43a, 43b, attach to rotatable wing section 33a, 33b, and carry respective engines 45a, 45b. As shown in FIG. 2A, rotatable wing sections 33a, 33b, are positioned substantially perpendicular to wing 37 for vertical take-off and landing. As shown in FIG. 2B, rotatable wing sections 33a, 33b, rotate about axis B to a position substantially parallel to wing 37 for horizontal flight.

Figure 3:
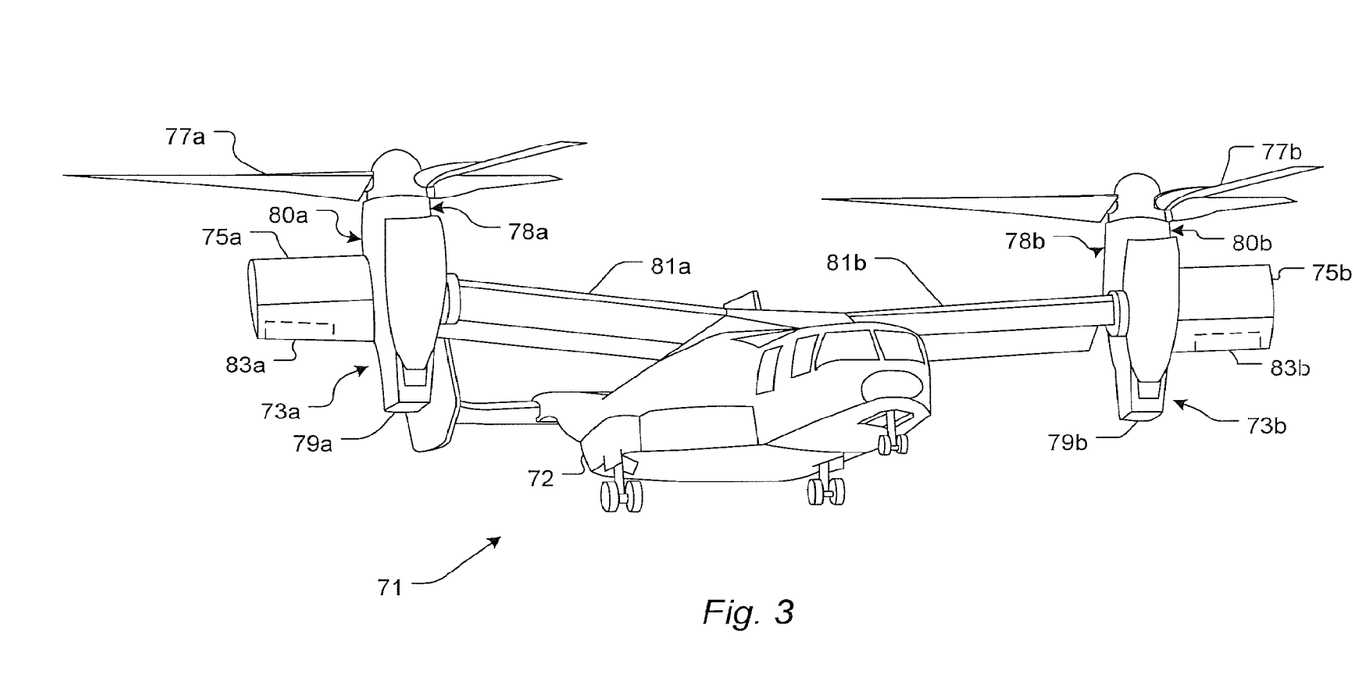
FIG. 3 is a perspective view of a tiltrotor aircraft in helicopter mode.

Referring now to FIG. 3 in the drawings, a perspective view of tiltrotor aircraft 71 is illustrated. Tiltrotor aircraft 71 is shown in helicopter mode with rotor assemblies 73a, 73b positioned for vertical take-off and landing. Rotor assemblies 73a, 73b include respective wing extensions 75a, 75b, rotors 77a, 77b, and nacelles 79a, 79b. Wing members 81a, 81b, pivotally attach to respective inboard sections 78a, 78b of nacelles 79a, 79b. Fuselage 72 rigidly attaches to wing members 81a, 81b. Rotor assemblies 73a, 73b pivotally rotate relative to wing members 81a, 81b, between a helicopter mode, in which rotor assemblies 73a, 73b, are tilted upward such that tiltrotor aircraft 71 flies like a conventional helicopter; and an airplane mode in which rotor assemblies 73a, 73b are tilted forward such that tiltrotor aircraft 71 flies like a conventional propeller-driven aircraft.

In some embodiments, wing extensions 75a, 75b are pivotally coupled to respective outboard sections 80a, 80b. In these embodiments, the wing extensions rotate independent of the nacelles' rotation. In some embodiments, the wing extensions could rigidly attach to the nacelles and rotate with the nacelles' rotation. Nacelles 79a, 79b carry an engine and transmission (not shown) which attach to rotors 77a, 77b. In the preferred embodiment, rotors 77a, 77b are proprotors, but it should be appreciated that any suitable rotor may be used in lieu of proprotors. In helicopter mode, rotors 77a, 77b create a rotor wash that exerts a downward force on wing members 81a, 81b and wing extensions 75a, 75b. The rotor wash can be manipulated with wing extensions 75a, 75b to create forward and reverse thrusts (see FIGS. 4B, 4C). A computer system or pilot could adjust the wing extension rotation to vary the magnitude of thrust, thereby controlling yaw movement. Yaw control is further discussed below in connection with FIGS. 4A-4D. In some embodiments, optional wing extension flaps 83a, 83b could be pivotally coupled to respective wing extensions 75a, 75b. During airplane mode, the wing extension flaps could be used for providing additional roll control.

Figure 4A:
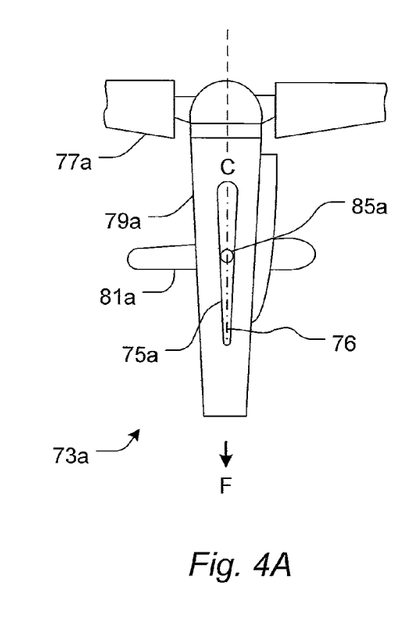
FIGS. 4A-C are side views of the rotor assembly as shown in FIG. 3.
Figure 4B:
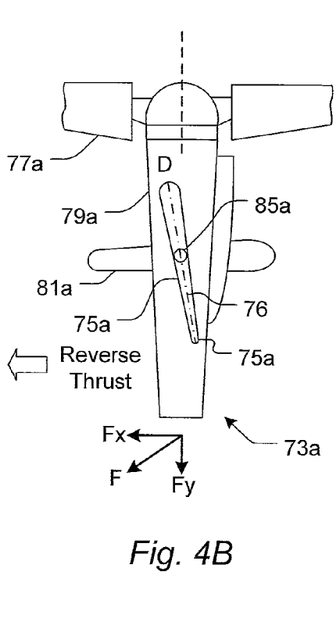
Figure 4C:
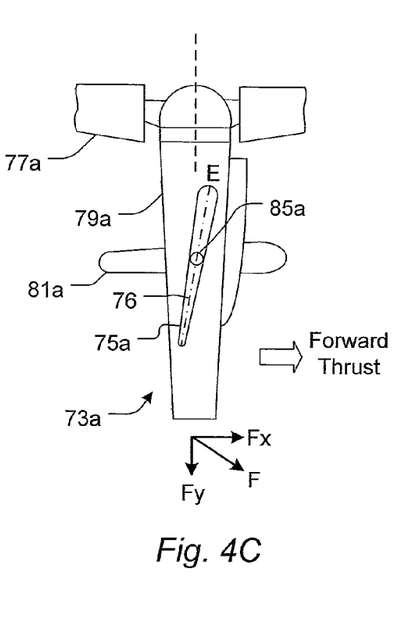
Figure 4D:
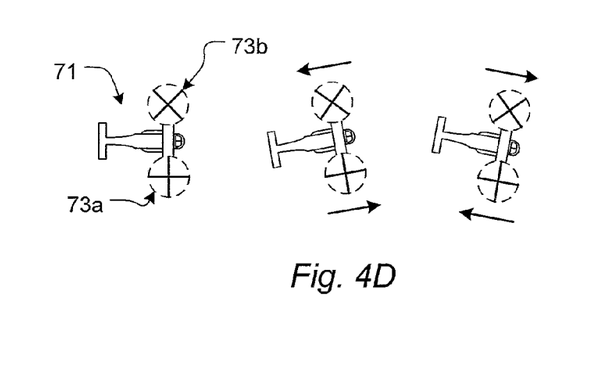
FIG. 4D is a top view of the tiltrotor aircraft as shown in FIG. 3.

Referring now to FIGS. 4A-4D in the drawings, FIGS. 4A-4C illustrate side views of rotor assembly 73a as shown in FIG. 3. FIG. 4D illustrates a top view of tiltrotor aircraft 71 as shown in FIG. 3. In FIGS. 4A-4C, rotor assembly 73a remains substantially perpendicular to wing 81a. Wing extension 75a is shown attached to rotor assembly 73a in positions C, D, and E relative to the rotor's axis of rotation. In position C, a wing extension chord 76 is aligns with the rotor axis of rotation; whereas, chord 76 does not align with the rotor axis of rotation in positions D and E. Joint 85a pivotally attaches wing extension 75a and nacelle 79a. It should be understood that some embodiments include joint 85a, while other embodiments could include any suitable device for attaching wing extension 75a to nacelle 79a. It should be appreciated that a hydraulic, motor, pneumatic, or any suitable device could be used to rotate wing extensions 75a, 75b about joint 85a.

In FIG. 4A, rotor wash (not shown) from rotor 77a creates a downward force F on wing member 81a and wing extension 75a. This figure shows wing extension 75a in position C, a position substantially perpendicular to wing 81a. In this position, no substantial horizontal force Fx from the rotor wash acts against wing extension 75a; therefore, no forward or reverse thrust is produced by the rotor wash. FIG. 4B shows wing extension 75a in position D. In this position, the rotor wash creates a horizontal force Fx and a vertical force Fy on wing wing extension 75a, thereby creating a reverse thrust. FIG. 4C shows wing extension 75a in position E. In this position, the rotor wash creates a horizontal force Fx and a vertical force Fy on wing extension 75a, thereby creating a forward thrust. It should be understood that the wing extension's angle of rotation is not limited to positions C, D, and E. A pilot and/or flight control system could vary the magnitude of thrust by changing the angle of rotation. For example, if the wing extension is at position D, and less reverse thrust is desired, then the pilot and/or flight control system can adjust from position D to a position between D and C. FIG. 4D shows a top view of tiltrotor aircraft 71 with rotor assemblies 73a, 73b. In this figure, the aircraft is shown moving in a clockwise and counterclockwise direction. Counterclockwise movement occurs when extensions 75a, 75b create respective forward and reverse thrusts. Clockwise movement occurs when extensions 75a, 75b create respective reverse and forward thrusts.

Figure 5:
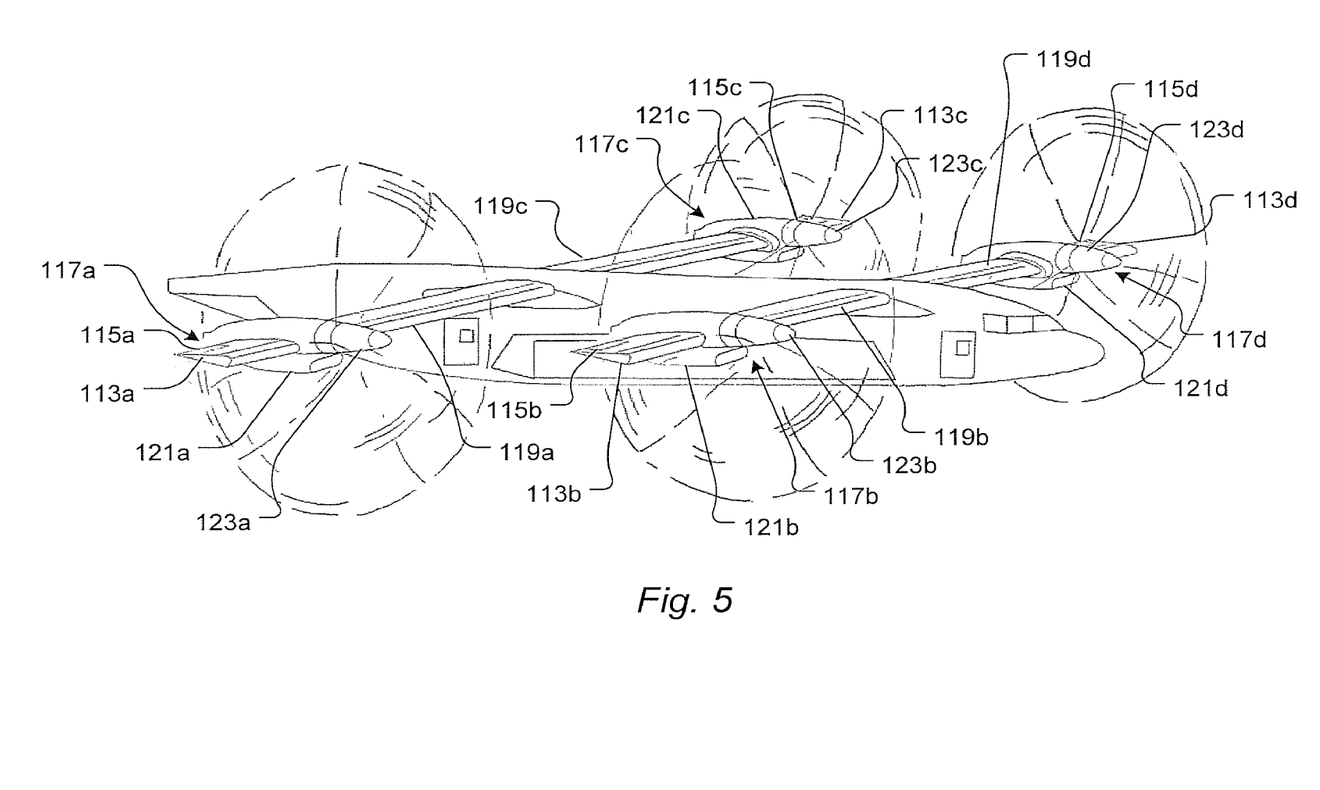
FIG. 5 is a perspective view of a quad-tiltrotor aircraft in airplane mode.

Referring now to FIG. 5 in the drawings, a perspective view of a quad-tiltrotor aircraft 111 is illustrated. It should be understood that the present disclosure can be applied to many different types of tiltrotor aircrafts, including a quad-tiltrotor aircraft. Quad-tiltrotor aircraft are similar to conventional tiltrotor aircraft in that quad-tiltrotor aircraft include rotatable rotor assemblies for operating in helicopter and airplane modes. Quad-tiltrotor aircraft differ from a conventional tiltrotor aircraft in that a quad-tiltrotor aircraft includes four rotor assemblies and typically carry heavier payloads. As the payload increases, more wing surface area is required during airplane mode. Therefore, wing extensions are particularly desired because they increase the aircraft's wing surface area.

In the illustrated embodiment, quad-tiltrotor aircraft 111 includes four wing extensions 113a-113d and four optional wing extension flaps 115a-115d pivotally attached to the outboard sections of respective rotor assemblies 117A-117d. Rotor assemblies 117A-117d are pivotally coupled to four respective wings members 119a-119d. Rotor assemblies 117A-117d include four nacelles 121A-121d which carry the engines and transmissions of quad-tiltrotor aircraft 111. Rotor assemblies 117A-117d also carry respective rotor 123a-123d on forward ends of rotor assemblies 117A-117d respectively. Rotor assemblies 117A-117d move or rotate relative to respective wing members 119a-119d between a helicopter mode, in which rotor assemblies 117A-117d are tilted upward such that quad-tiltrotor aircraft 111 flies like a conventional helicopter, and an airplane mode, in which rotor assemblies 117A-117d are tilted forward such that quad-tiltrotor aircraft 111 flies like a conventional propeller-driven aircraft. In helicopter mode, wing extensions 113a-113d move or rotate relative to wing members 119a-119d, thereby providing additional yaw control.

The wing extensions provide quad-tiltrotor aircraft 111 additional yaw control during helicopter mode and additional lift during airplane mode. In airplane mode the wing extensions are positioned substantially parallel to the aircraft's wing members. In this position, the aircraft's overall wing surface area increases, thereby creating additional lift. The following aerodynamic equation helps in understanding this principal:

$$L = \frac{1}{2} C_L \rho V^2 A$$

[L=lift force; $C_L$=coefficient of lift; p=air density; V=velocity; A=wing surface area] The equation indicates that lift is directly proportional to the wing's surface area. Assuming all other variables remain relatively constant, the equation shows that as the wing's surface area increases, so does the lift force. Increasing the lift force, hence the aircraft's payload capacity, is desired when large personnel or vehicular payloads are transported, as shown in FIGS. 7A, 7B, respectively.

Figure 6:
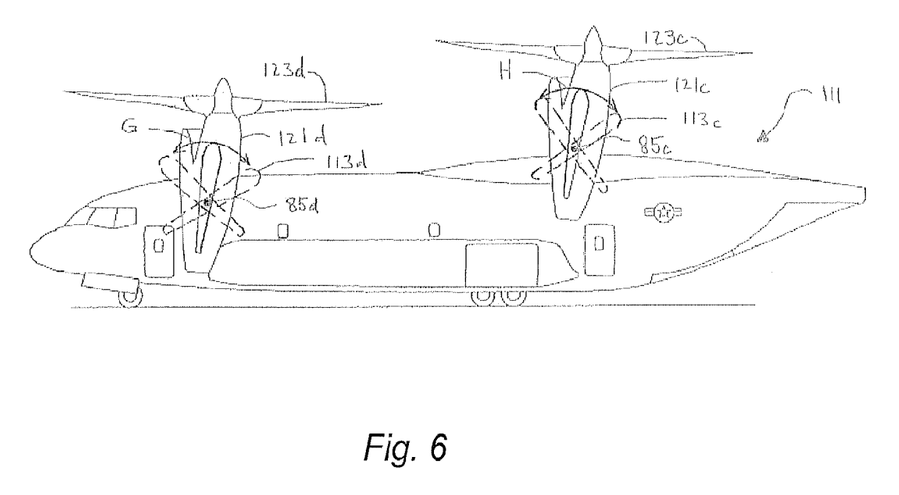
FIG. 6 is a side view of the quad-tiltrotor aircraft as shown in FIG. 5.

Referring now to FIG. 6 in the drawings, a side view of quad-tiltrotor aircraft 111, as shown in FIG. 5, is illustrated. Joints 85c, 85d couple wing extensions 113c, 113d to respective nacelles 121c, 121d. Arcs G, H show the rotational path of wing extensions 113c, 113d. It should be understood that in some embodiments of a quad-tiltrotor aircraft, the wing extensions could be rigidly attached to the nacelles.

Figure 7A:
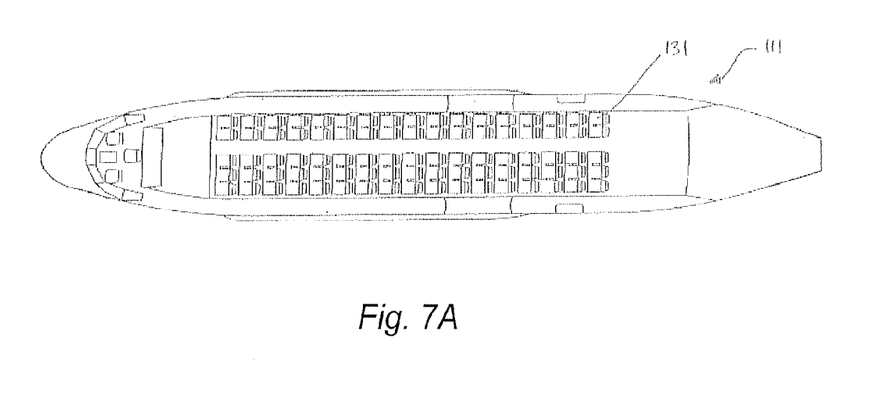
FIG. 7A is a schematic, top view of the quad-tiltrotor aircraft as shown in FIG. 6.
Figure 7B:
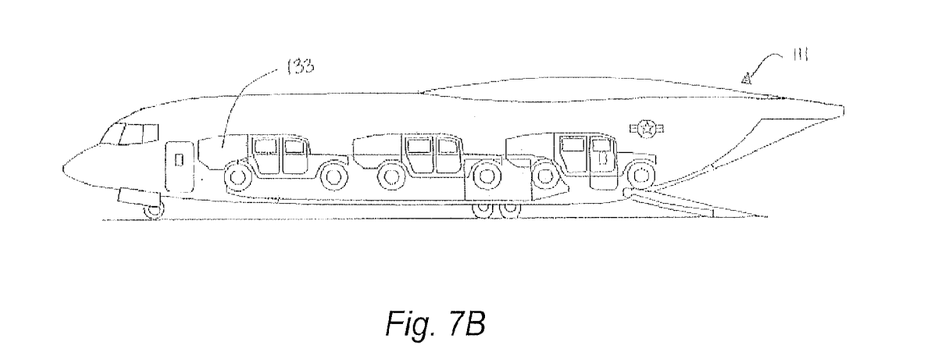
FIG. 7B is a schematic, side view of the quad-tiltrotor aircraft as shown in FIG. 6.

Referring now to FIG. 7A and 7B in the drawings, a schematic view of quad-tiltrotor aircraft 111, as shown in FIG. 6, is illustrated. FIG. 7A shows a top, schematic view of quad-tiltrotor aircraft 111 carrying a plurality of passenger seats 131. Here, quad-tiltrotor aircraft 111 is configured for personnel transportation. FIG. 7B shows a side, schematic view of quad-tiltrotor aircraft 111 carrying a plurality of vehicles 133. Here, quad-tiltrotor aircraft 111 is configured for vehicular transportation. It should be understood that FIGS. 7A, 7B are two among many embodiments of quad-tiltrotor aircraft 111. Quad-tiltrotor aircraft 111 could be designed in a myriad of alternative configurations.

The concepts of the present application are unique in that the present application introduces a rotatable wing extension for a tiltrotor aircraft. It is evident by the foregoing description that the subject application has significant benefits and advantages, in particular: (1) the wing extension provides additional wing surface area, which enables the aircraft to carry heavier payloads during airplane mode; and (2) during helicopter mode, the rotatable wing extension provides additional yaw control.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present application is shown in a limited number of forms, it is not limited to just these forms, but is amenable to various changes and modifications without departing from the spirit thereof.

The invention claimed is:

1. A tiltrotor aircraft, comprising:
   a fuselage;
   a first wing member attached to the fuselage;
   a second wing member attached to the fuselage;
   a first nacelle that is rotatable relative to the first wing member, the first nacelle having:
      an inboard section coupled to the first wing member; and
      an outboard section;
   a second nacelle that is rotatable relative to the second wing member, the second nacelle having:
      an inboard section coupled to the second wing member; and
      an outboard section;
   a first wing extension coupled to the outboard section of the first nacelle, the first wing extension having a flap; and
   a second wing extension coupled to the outboard section of the second nacelle the second wing extension having a flap;
   wherein the first wing extension is pivotally coupled to the outboard section of the first nacelle.

2. The tiltrotor aircraft according to claim 1, wherein the first wing extension is coupled to the outboard section of the first nacelle, so as to provide yaw control when the tiltrotor aircraft is in a helicopter mode.

3. The tiltrotor aircraft according to claim 1, wherein the tiltrotor aircraft is a quad-tiltrotor aircraft.

4. The tiltrotor aircraft according to claim 3, wherein the quad-tiltrotor aircraft comprises:
   four wing extensions in total.

5. A tiltrotor aircraft, comprising:
   a fuselage;
   a first nacelle that is rotatable relative to a first wing member, the first nacelle having:
      an inboard section coupled to the first wing member; and
      an outboard section;
   a second nacelle that is rotatable relative to a second wing member, the second nacelle having:
      an inboard section coupled to the second wing member; and
      an outboard section;
   a first rotor assembly supported by the first nacelle;
   a second rotor assembly supported by the second nacelle;
   a first wing extension coupled to the outboard section of the first nacelle the first wing extension having a flap; and
   a second wing extension coupled to the outboard section of the second nacelle the second wing extension having a flap;
   wherein the first wing extension is pivotally coupled to the outboard section of the first nacelle.

6. The tiltrotor aircraft according to claim 5, wherein the tiltrotor aircraft is a quad-tiltrotor aircraft.

7. The tiltrotor aircraft according to claim 6, wherein the quad-tiltrotor aircraft comprises:
   four wing extensions in total.

8. A method for controlling yaw movement of an aircraft, comprising:
   providing the tiltrotor aircraft of claim 5;
   rotating the first and second rotor assemblies such that rotorwash is created;
   pivotally rotating the first and second wing extensions in the rotorwash, thereby at least partially controlling yaw movement of the aircraft during helicopter mode; and
   providing a pivot joint coupled to the first nacelle and first wing extension.

9. The method according to claim 8, wherein the helicopter mode is achieved by positioning the nacelle in a position for vertical take-off and landing.

10. The method according to claim 8, wherein pivotally rotating the first wing extension is achieved by rotating the first wing extension about the pivot joint, such that the first wing extension chord is positioned at an angle relative to the rotor axis of rotation.

* * * * *